US010812894B2

(12) United States Patent
Zhou

(10) Patent No.: US 10,812,894 B2
(45) Date of Patent: Oct. 20, 2020

(54) PORTABLE COMMUNICATION DEVICE AND METHOD OF OPERATING THE SAME IN COVERT OPERATION MODE

(71) Applicant: MOTOROLA SOLUTIONS, INC., Chicago, IL (US)

(72) Inventor: Yu Zhou, Sichuan (CN)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 16/466,838

(22) PCT Filed: Dec. 23, 2016

(86) PCT No.: PCT/CN2016/111796
§ 371 (c)(1),
(2) Date: Jun. 5, 2019

(87) PCT Pub. No.: WO2018/112917
PCT Pub. Date: Jun. 28, 2018

(65) Prior Publication Data
US 2019/0342653 A1    Nov. 7, 2019

(51) Int. Cl.
*H04R 1/10* (2006.01)
*H04M 1/60* (2006.01)
*H04R 29/00* (2006.01)

(52) U.S. Cl.
CPC ........ *H04R 1/1091* (2013.01); *H04M 1/6066* (2013.01); *H04R 29/004* (2013.01);
(Continued)

(58) Field of Classification Search
CPC  H04R 1/109; H04R 29/004; H04R 2201/107; H04R 2420/07; H04R 2430/01; H04M 1/6066
See application file for complete search history.

(56) References Cited

U.S. PATENT DOCUMENTS 5,530,914 A    6/1996  McPheters
6,711,258 B1   3/2004  Sung
(Continued)

FOREIGN PATENT DOCUMENTS

EP       1486055        4/2013

OTHER PUBLICATIONS

United Kingdom (UKIPO) Office Action dated Aug. 20, 2019 for related Application No. GB1908068.8 (3 pages).
(Continued)

*Primary Examiner* — Zhitong Chen
(74) *Attorney, Agent, or Firm* — Michael Best & Friedrich LLP

(57) ABSTRACT

A portable communication device operating in a covert mode including an electronic processor that detects a presence of a wireless audio accessory. The portable communication device receives and transmits audio data to the wireless audio accessory. The electronic processor monitors a signal quality of the wireless link and a continued presence of the wireless audio accessory and determines whether the portable communication device is operating in a covert operation mode. Responsive to determining that the portable communication device is operating in the covert operation mode and determining, via the monitoring, that the signal quality of the wireless link has fallen below a threshold or that the wireless audio accessory is no longer present: receiving, at the portable communication device, subsequent audio data, recording the subsequent audio data, and refraining from outputting the subsequent audio data via a speaker of the portable communication device.

19 Claims, 2 Drawing Sheets

(52) U.S. Cl.
CPC .... *H04R 2201/107* (2013.01); *H04R 2420/07* (2013.01); *H04R 2430/01* (2013.01)

(56) References Cited

U.S. PATENT DOCUMENTS

| | | |
|---|---|---|
| 7,469,051 B2 | 12/2008 | Sapashe et al. |
| 7,756,280 B2 | 7/2010 | Hsieh et al. |
| 9,191,880 B2 | 11/2015 | Rathus et al. |
| 2004/0203351 A1 | 10/2004 | Shearer et al. |
| 2006/0285677 A1* | 12/2006 | Souma ................ H04M 1/6058 379/388.03 |
| 2007/0047506 A1 | 3/2007 | Froehling et al. |
| 2007/0192067 A1 | 8/2007 | Wong et al. |
| 2007/0232222 A1 | 10/2007 | de Jong |
| 2008/0132290 A1 | 6/2008 | Sharabi et al. |
| 2011/0022203 A1* | 1/2011 | Woo ...................... G06F 3/0482 700/94 |
| 2011/0185202 A1 | 7/2011 | Black et al. |
| 2013/0095761 A1* | 4/2013 | Chu ...................... H04W 36/30 455/41.2 |
| 2013/0106975 A1 | 5/2013 | Chu et al. |
| 2015/0036573 A1* | 2/2015 | Malik ................ H04W 52/0254 370/311 |
| 2016/0360018 A1 | 12/2016 | Watson et al. |

OTHER PUBLICATIONS

PCT/CN2016/111796 International Search Report and Written Opinion of the International Searching Authority dated Jul. 28, 2017 (7 pages).

* cited by examiner

PORTABLE COMMUNICATION DEVICE AND METHOD OF OPERATING THE SAME IN COVERT OPERATION MODE

BACKGROUND OF THE INVENTION

Some portable communication devices, for example two-way radios and smart phones, may wirelessly link to wireless audio accessories. For example, a portable communication device may transmit audio data to a headset for private listening by a user. However, when the wireless link fails, the audio data is played via a speaker of the portable communication device. This may comprise private audio messages included in the audio data by allowing unintended recipients to listen in on the audio message.

When an emergency responder is handling a public safety incident, the responder may place their portable communication device, such as two-way radios and smart phones, in covert operation mode. In the covert operation mode, visual, audible, or tactile output from the portable communication device may be limited to prevent the output from compromising the responder's position or role in the incident or from being received by unintended recipients.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
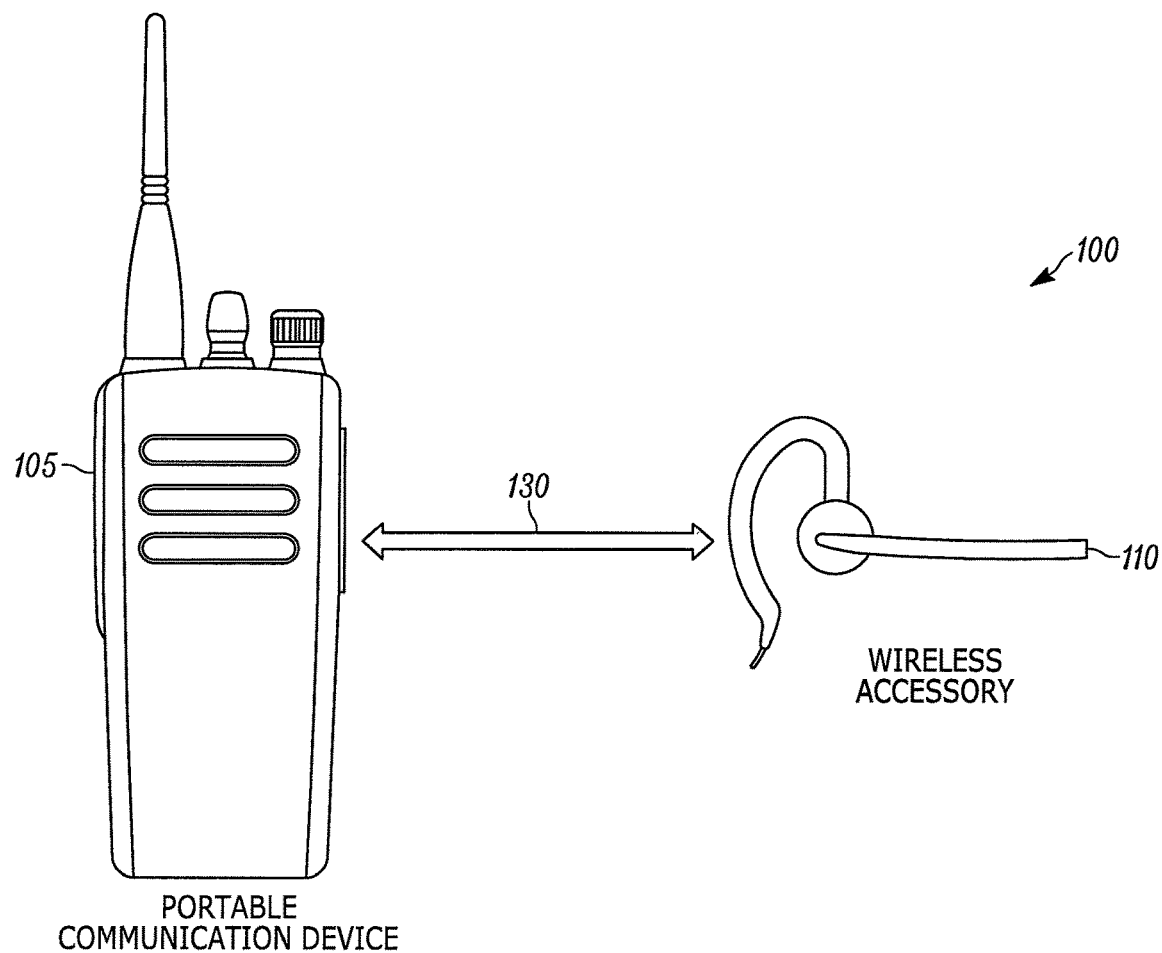
FIG. 1 is a block diagram of a wireless communication system including a portable communication device and a wireless audio accessory in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One embodiment provides a method of operating a portable communication device. The method includes detecting, by an electronic processor, a presence of a wireless audio accessory, receiving, at the portable communication device, audio data, and subsequently transmitting the audio data, via a wireless link to the wireless audio accessory. The method includes monitoring, by the electronic processor, a signal quality of the wireless link and a continued presence of the wireless audio accessory. The method includes determining, by the electronic processor, whether the portable communication device is operating in a covert operation mode. The method also includes, responsive to detecting that the portable communication device is operating in the covert operation mode and determining, via the monitoring, that the signal quality of the wireless link has fallen below a threshold or that the wireless audio accessory is no longer present: receiving, at the portable communication device, subsequent audio data, recording the subsequent audio data, and refraining from playing the subsequent audio data from a speaker of the portable communication device.

Another embodiment provides a portable communication device including a wireless transceiver configured to transmit audio data to a wireless audio accessory via a wireless link, a speaker, and an electronic processor communicatively coupled to the wireless transceiver and the speaker. The electronic processor is configured to detect a presence of the wireless audio accessory, receive audio data, subsequently transmit the audio data, via the wireless link, to the wireless audio accessory, and monitor a signal quality of the wireless link and a continued presence of the wireless audio accessory. The electronic processor is also configured to determine whether the portable communication device is operating in a covert operation mode. The electronic processor is further configured to, responsive to detecting that the portable communication device is operating in the covert operation mode and determining, via the monitoring, that the signal quality of the wireless link has fallen below a threshold or that the wireless audio accessory is no longer present, receive, at the portable communication device, subsequent audio data, record the subsequent audio data, and refrain from playing the subsequent audio data from a speaker of the portable communication device.

FIG. 1 is a block diagram of a wireless communication system 100 including a portable communication device 105 and a wireless audio accessory 110 in accordance with some embodiments. The portable communication device 105 is illustrated in FIG. 1 as a radio but may include various types and styles of communication devices including mobile telephones, smart telephones, smart watches, tablet computers, land mobile radios, and others. The portable communication device 105 may operate over various communication channels and networks including, for example, two-way land mobile radio networks.

The wireless audio accessory 110 includes at least one accessory speaker and at least one accessory wireless transceiver. As illustrated in FIG. 1, the wireless audio accessory 110 may include an earpiece. However, the wireless audio accessory 110 may include other types and styles of wireless audio accessories, including headphones, a headset, a set of wired or wireless earpieces, and the like. The wireless audio accessory 110 may also include additional components, including one or more microphones, input mechanisms, output mechanism, or a combination thereof. The wireless audio accessory 110 may also include a headband, a clip, or other mechanism that allows a user to wear the wireless audio accessory.

The portable communication device 105 is communicatively connected to the wireless audio accessory 110 via a wireless link 130. In some embodiments, the wireless link 130 operates via short-range radio frequency (RF) signals that form a wireless local area network (WLAN). For example, the portable communication device 105 may communicate with the wireless audio accessory 110 via a Wi-Fi or Bluetooth connection. As discussed in detail below, the wireless audio accessory 110 is configured to receive audio data (audio messages, such as voice calls) from the portable communication device 105 over the wireless link 130 and output the audio data via the accessory speaker.

Figure 2:
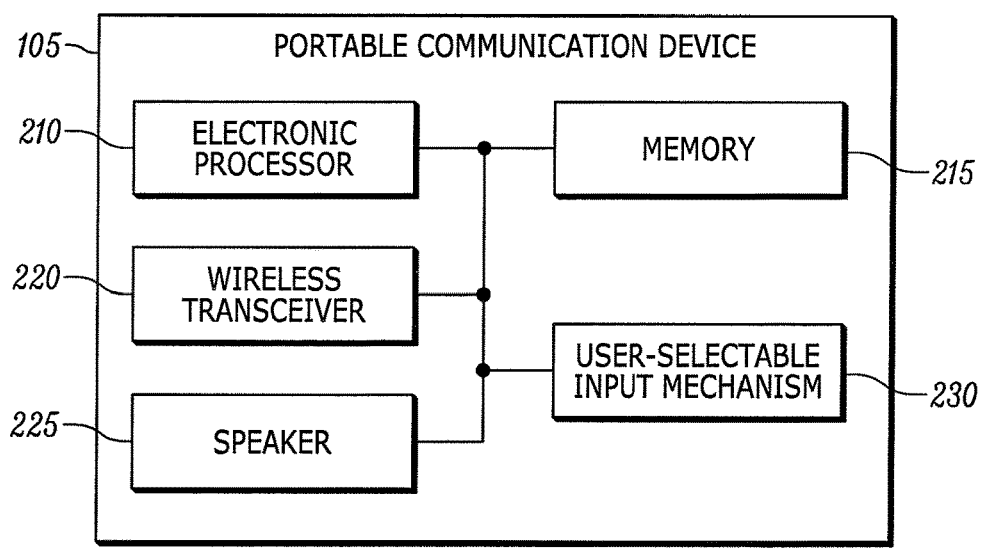
FIG. 2 is a block diagram of the portable communication device of FIG. 1 in accordance with some embodiments.

FIG. 2 is a block diagram illustrating the portable communication device 105 in accordance with some embodiments. As illustrated, the portable communication device 105 includes an electronic processor 210 (for example, a programmable electronic microprocessor, a microcontroller, or a similar electronic device), a memory 215 (for example, non-transitory, machine-readable memory), and a wireless transceiver 220, a speaker 225, and a user-selectable input mechanism 230. The electronic processor 210 is communicatively coupled to the memory 215, the wireless transceiver 220, the speaker 225, and the user-selectable input mechanism 230 through one or more connections or buses. It should be understood that the portable communication device 105 may include additional, fewer, or different components than those illustrated in FIG. 2. For example, the portable communication device 105 may include a plurality of independent electronic processors each configured to perform specific functions or sub-functions. Also, the portable communication device 105 may include at least one additional wireless transceiver for receiving audio data, such as voice calls, push-to-talk communications, and the like, over a network, such as the Internet or a telecommunications network.

The electronic processor 210 is configured to retrieve instructions stored in the memory 215 and execute the instructions to perform the processes and methods described herein. For example, the electronic processor 210 may execute instructions stored in the memory 215 to output audio data via the speaker 225. The audio data output via the speaker 225 may be received by the portable communication device 105 over a network, from the memory 215, or from another source.

Similarly, the electronic processor 210 may execute instructions stored in the memory 215 to establish the wireless link 130 with the wireless audio accessory 110 using the wireless transceiver 220. The wireless transceiver 220 transmits audio data via the wireless link 130 to the accessory wireless transceiver included in the wireless audio accessory 110, which may output the received audio data via the accessory speaker. In some embodiments, the accessory wireless transceiver included in the wireless audio accessory 110 is also configured to transmit data to the wireless transceiver 220 over the wireless link 130. For example, the accessory wireless transceiver included in the wireless audio accessory 110 may be configured to receive user input through one or more input mechanisms and may be configured to transmit the received user input (or a version thereof) to the wireless transceiver 220.

The electronic processor 120 also executes instructions stored in the memory 215 to process input received through the user-selectable input mechanism 230. In some embodiments, the user-selectable input mechanism 230 includes one or more push-buttons, dials, knobs, touchscreens, other mechanisms, or a combination thereof that receives input from a user and communicates received input to the electronic processor 210. For example, the electronic processor 120 may receive input via the user-selectable input mechanism 230 and may activate playback of audio data recorded in the memory 215 based on the input. Similarly, the electronic processor 120 may receive input via the user-selectable input mechanism 230 and may select a particular mode of operation for the portable communication device 105.

For example, the electronic processor 210 may operate the portable communication device 105 in a covert operation mode. In the covert operation mode, the electronic processor 210 limits output of the speaker 225, such as by muting the speaker 225. In the covert operation mode, the electronic processor 210 may similarly limit the output of other output mechanisms of the portable communication device 105, such as turning off a display device or other visual indicators included in the portable communication device 105. As noted above, in some embodiments, the electronic processor 210 may place the portable communication device 105 in the covert operation mode in response to input received from a user, such as through the user-selectable input mechanism 230. Alternatively or in addition, the electronic processor 210 may place the portable communication device 105 in the covert operation mode in response to a data received from an external source, such as over a network.

As described above, a user of the portable communication device 105, such as an emergency responder, may use the wireless audio accessory 110 when the portable communication device 105 is in a covert operation mode to discreetly receive audio data, such as voice calls or other types of audio communications. If the wireless link 130 between the portable communication device 105 and the wireless audio accessory 110 fails, however, the audio data may be played through the speaker 225 of the portable communication device 105, which undermines the covert operation mode. However, if the audio data is not played through the speaker 225 of the portable communication device 105, the audio data may not be received by the user of the portable communication device 105. For example, when the audio data is a voice call and the wireless link 130 fails, the voice call may be terminated.

Figure 3:
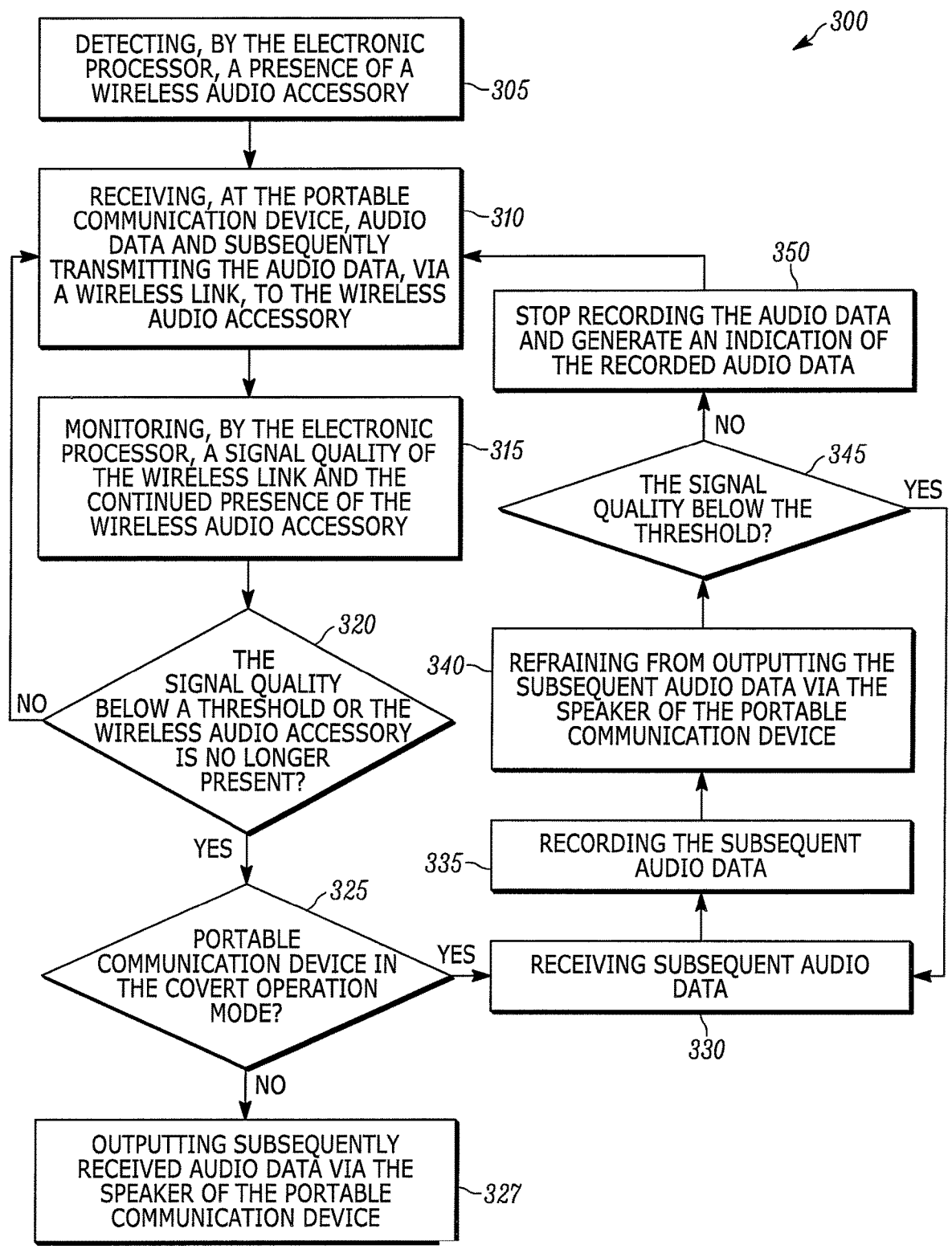
FIG. 3 is a flowchart of a method of operating the wireless communication system of FIG. 1 in a covert operation mode in accordance with some embodiments.

Accordingly, the electronic processor 210 is configured to execute instructions stored in the memory 215 to manage audio data output via the wireless audio accessory 110 when the portable communication device 105 is in the covert operation mode. For example, FIG. 3 is a flowchart of a method 300 of operating the wireless communication system 100 in a covert operation mode performed by the electronic processor 210 according to some embodiments. As part of the method 300, the electronic processor 210 detects a presence of the wireless audio accessory 110 (block 305). For example, in some embodiments, the portable communication device 105 and the wireless audio accessory 110 link via Bluetooth or otherwise communicatively connect via the wireless link 130. Thus, the electronic processor 210 may be configured to detect a presence of the wireless audio accessory by monitoring a connection status of the wireless link 130 between the portable communication device 105 and the wireless audio accessory 110.

As illustrated in FIG. 3, when the portable communication device 105 receives audio after the presence of the wireless audio accessory 110 is detected, the electronic processor 210 subsequently transmits the audio data to the wireless audio accessory 110 via the wireless link 130 (block 310). The electronic processor 210 may transmit the audio data when, for example, audio data is received by the portable communication device 105 from another transmitting portable communication device, such as a voice call, push-to-talk communication, or other form communication. Alternatively or in addition, the electronic processor 210 may transmit audio data stored in the memory 215 or otherwise generated by the electronic processor 210. For example, in some embodiments, the electronic processor 210 may be configured to generate audio data that narrates textual data, such as text messages, e-mail messages, and the like, and the electronic processor 210 may transmit this generated audio data to the wireless audio accessory.

In response to transmitting the audio data to the wireless audio accessory 110, the electronic processor 210 monitors the signal quality of the wireless link 130 and the continued presence of the wireless audio accessory 110 (block 315). For example, the electronic processor 210 may detect and record a data transmission rate, a packet loss rate, an error rate, other characteristics of the transmission, or a combination thereof to determine a quality of the data transmission via the wireless link 130. Similarly, as described above, the electronic processor 210 may also detect the continued presence of the wireless audio accessory 110 by monitoring a connection status of the wireless link 130 between the portable communication device 105 and the wireless audio accessory 110. By monitoring both of these conditions, the electronic processor 120 may detect when the wireless connection between the portable communication device 105 and the wireless audio accessory 110 has failed as well as when the wireless connection has not failed but is impacting the quality of the transmitted audio data. For example, when a user is unable to hear or understand data received over the wireless link 130 at the wireless audio accessory 110 this causes similar issues as when the wireless link 130 has completely failed. It should be understood that, in some embodiments, rather than monitoring both of these conditions, the electronic processor 120 may only monitor one condition. For example, in some embodiments, when electronic processor 120 may only monitor the signal quality of the wireless link 130, which will have a particular extreme value when the wireless audio accessory 110 is no longer present and, hence, the wireless link 130 is not available. In some embodiments, the electronic processor 120 may allow a user to manually configure what conditions are monitored.

In response to the monitoring, the electronic processor 210 determines whether the signal quality is below a threshold or whether the wireless audio accessory 110 is no longer present (block 320). When there are multiple devices communicating in the same frequency or band as the wireless audio accessory 110, data transmitted via the wireless link 130 may experience interference, which may cause bad audio quality or even a disconnection between the portable communication device 105 and the wireless audio accessory 110. Accordingly, the threshold may be set at a predetermined level at which the audio message transmitted in the wireless link 130 becomes substantially unintelligible. In other embodiments, as noted above, the threshold is set at a predetermined level at which the wireless link 130 is not available.

The electronic processor 210 also determines whether the portable communication device 105 is operating in the covert operation mode (block 325). As described above, the electronic processor 210 may place the portable communication device 105 in the covert operation mode in response to user input or a signal received from an external source. In some embodiments, the electronic processor 210 may set a flag or other variable to indicate a current operation mode of the portable communication device 105 (stored in the memory 215), which the electronic processor 210 may access to determine whether the portable communication device 105 is operating in the covert operation mode. It should be understood that, in some embodiments, the electronic processor 210 determines whether the portable communication device 105 is operating in the covert operation mode at one or more points during the method 300. For example, in some embodiments, the electronic processor 120 may determine whether the portable communication device 105 is operating in the covert operation mode before performing the monitoring of the wireless link 130 as described above.

As illustrated in FIG. 3, in response to determining, via the monitoring, that the signal quality of the wireless link 130 has not fallen below the threshold and the wireless audio accessory 110 remains present (block 320), the electronic processor 210 continues to transmit the audio data to the wireless audio accessory 110 (block 310). As also illustrated in FIG. 3, in response to determining, via the monitoring, that the signal quality of the wireless link 130 has fallen below the threshold or the wireless audio accessory 110 is no longer present (block 320) but the portable communication device 105 is not in the covert operation mode (block 325), the electronic processor 210 outputs subsequently received audio data via the speaker 225 of the portable communication device (block 327).

Alternatively, in response to detecting that the portable communication device 105 is operating in the covert operation mode (block 325) and determining, via the monitoring, that the signal quality of the wireless link 130 has fallen below the threshold or that the wireless audio accessory 110 is no longer present (block 320), the electronic processor 210 receives subsequent audio data (block 330), records the subsequent audio data (for example, in the memory 215) (block 335), and refrains from outputting the subsequent audio data (including subsequent new audio message received by the portable communication device 105) via the speaker 225 of the portable communication device 105 (block 340). In some embodiments, the electronic processor 210 records the subsequent audio data in place of transmitting the subsequent audio data over the wireless link 130. However, in some embodiments, when the wireless link 130 remains established, the electronic processor 210 may record the subsequently-received audio data and transmit the subsequently-received audio data to the wireless audio accessory 110 via the wireless link 130. In some embodiments, the electronic processor 210 may apply more than one threshold to identify when to record subsequently-received audio data and when to additionally transmit the subsequently-received audio data. For example, when the signal quality reaches a particular minimum threshold, the electronic processor 210 may stop transmitting the subsequently-received audio stop and only record the data.

In response to recording the subsequent audio data (block 335), the electronic processor 210 continues to monitor the signal quality of the wireless link 130 as described above, and, in response to the determining that the signal quality is still below the threshold (block 345), the electronic processor 120 continues recording the subsequent audio data (block 335). Alternatively, in response to determining that the signal quality no longer falls below (has risen above) the threshold (block 345), the electronic processor 210 stops recording the subsequent audio data and generates an indication of the recorded subsequent audio data (block 350). The indication alerts the user of the availability of the recorded subsequent audio data for playback. The indication may be a visual indication (an icon or textual message or the activation of a light-emitting-diode (LED)), an audible indication (a tone or sound), or both that may be output via the portable communication device 105 (the speaker 225). In response to receiving a selection of the indication (through the user-selectable input mechanism or another mechanism on the portable communication device 105 or the wireless audio accessory 110), the electronic processor 120 may playback the recorded subsequent audio data. For example, the electronic processor 120 may output the recorded subsequent audio data through the speaker 225 of the portable communication device 105 or may transmit the recorded subsequent audio data to the wireless audio accessory 110 for output via the accessory speaker.

Alternatively or in addition, it should be understood that the electronic processor 120 may stop recording the audio data and generate the indication when audio data is no longer received by the portable communication device 105, such as when a voice call ends. Similarly, in some embodiments, the electronic processor 120 may stop recording the audio data when the portable communication device 105 is no longer in the covert operation mode. For example, when the portable communication device 105 switches out of the covert operation mode while the electronic processor 210 is recording audio data, the electronic processor 210 may stop recording the audio data and generate the indication as described above and also output any subsequent audio data via the speaker 225 of the portable communication device 105.

Also, in some embodiments, the electronic processor 210 may be configured to automatically replay recorded data in response to particular conditions. For example, the electronic processor 210 may automatically replay recorded audio data when the signal quality rises above the threshold or the presence of the wireless audio accessory 110 is detected again or when the portable communication device 105 is no longer in the covert operation mode. In some embodiments, this automatic replay may occur only when the portable communication device 105 is not currently receiving any new audio data, such as voice calls. Also, the electronic processor 210 may generate audio data to play with the playback of the recorded audio data (such as prior to the playback) that explains that the audio data was recorded and may also provide additional information regarding the recorded audio data, such as a time and date that the audio data was received and whether any portion of the audio data was previously transmitted to the wireless audio accessory.

In some embodiments, when the signal quality changes from above to below the threshold, or from below to above the threshold, the electronic processor 210 records or stops recording the audio data after a time delay. For example, the electronic processor 120 may delay until the signal quality drops below the threshold for a particular period of time before recording the audio data. Similarly, in block 335 of the method, the signal quality may need to rise above the threshold for another particular period of time before the electronic processor 210 stops recording the audio data. Also, in some embodiments, the electronic processor 120 may buffer portions of audio data transmitted over the wireless link 130 (a few seconds of audio data) to allow the electronic processor 120 to record a portion of the audio data before, after, or both a failure of the wireless link 130 or a degradation of signal quality.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method of operating a portable communication device, the method comprising:
   detecting, by an electronic processor, a presence of a wireless audio accessory;
   receiving, at the portable communication device, audio data and subsequently transmitting the audio data, via a wireless link, to the wireless audio accessory;
   determining, by the electronic processor, whether the portable communication device is operating in a covert operation mode;
   responsive to determining that the portable communication device is operating in the covert operation mode, monitoring, by the electronic processor, a signal quality of the wireless link and a continued presence of the wireless audio accessory, and
   responsive to determining, via the monitoring, that the signal quality of the wireless link has fallen below a threshold or that the wireless audio accessory is no longer present:
      receiving, at the portable communication device, subsequent audio data,
      recording the subsequent audio data, and
      refraining from outputting the subsequent audio data via a speaker of the portable communication device.

2. The method of claim 1, wherein monitoring, by the electronic processor, the continued presence of the wireless audio accessory includes monitoring a connection status of the portable communication device to the wireless audio accessory.

3. The method of claim 1, wherein monitoring, by the electronic processor, the signal quality of the wireless link includes detecting at least one selected from a group consisting of a data transmission rate, a packet loss rate, and an error rate of data transmitted via the wireless link.

4. The method of claim 1, further comprising stopping recording of the subsequent audio data when the signal quality returns to a level above the threshold.

5. The method of claim 1, further comprising generating an indication representing an availability of the recorded subsequent audio data.

6. The method of claim 5, wherein generating the indication includes generating at least one selected from a group consisting of a visual indication and an audible indication.

7. The method of claim 5, further comprising outputting the indication via at least one selected from a group consisting of the portable communication device and the wireless audio accessory.

8. The method of claim 5, further comprising outputting the recorded subsequent audio data in response to receiving a selection via a user-selectable input mechanism of the portable communication device.

9. The method of claim 8, wherein outputting the recorded subsequent audio data in response to receiving the selection via the user-selectable input mechanism includes outputting the recorded subsequent audio data via at least one selected from a group consisting of the portable communication device and the wireless audio accessory.

10. The method of claim 1, further comprising, responsive to determining that the portable communication device is not operating in the covert operation mode and determining, via the monitoring, that the signal quality of the wireless link has fallen below the threshold or that the wireless audio accessory is no longer present, outputting the subsequent audio data via the speaker of the portable communication device.

11. A portable communication device comprising:
   a wireless transceiver configured to transmit audio data to an wireless audio accessory via a wireless link;
   a speaker; and
   an electronic processor communicatively coupled to the wireless transceiver and the speaker, the electronic processor configured to
      detect a presence of the wireless audio accessory,
      receive the audio data and subsequently transmit the audio data, via the wireless link, to the wireless audio accessory,
      determine whether the portable communication device is operating in a covert operation mode, and
      responsive to determining that the portable communication device is operating in the covert operation mode, monitor a signal quality of the wireless link and a continued presence of the wireless audio accessory, and
      responsive to determining, via the monitoring, that the signal quality of the wireless link has fallen below a threshold or that the wireless audio accessory is no longer present:
         receive subsequent audio data,
         record the subsequent audio data in memory included in the portable communication device, and
         refrain from outputting the subsequent audio data via the speaker of the portable communication device.

12. The portable communication device of claim 11, wherein the electronic processor is further configured to, responsive to determining that the portable communication device is not operating in the covert operation mode and determining, via the monitoring, that the signal quality of the wireless link has fallen below the threshold or that the wireless audio accessory is no longer present, output the subsequent audio data via the speaker of the portable communication device.

13. The portable communication device of claim 11, wherein the electronic processor is configured to monitor the continued presence of the wireless audio accessory by monitoring a connection status of the portable communication device to the wireless audio accessory.

14. The portable communication device of claim 11, wherein the electronic processor is configured to monitor the signal quality of the wireless link by detecting at least one selected from a group consisting of a data transmission rate, a packet loss rate, and an error rate of data transmitted via the wireless link.

15. The portable communication device of claim 11, wherein the electronic processor is further configured to stop recording the subsequent audio data when the signal quality has risen above the threshold.

16. The portable communication device of claim 11, wherein the electronic processor is further configured to generate an indication representing an availability of the recorded subsequent audio data.

17. The portable communication device of claim 16, wherein the indication is at least one selected from a group consisting of an audible indication and a visual indication.

18. The portable communication device of claim 16, wherein the electronic processor is configured to transmit the indication to the wireless audio accessory.

19. The portable communication device of claim 16, further comprising a user-selectable input mechanism communicatively coupled to the electronic processor, wherein the electronic processor is further configured to transmit the recorded subsequent audio data to the wireless audio accessory in response to a selection of the indication received via the user-selectable input mechanism.

* * * * *